United States Patent
Holz et al.

(10) Patent No.: US 10,268,825 B2
(45) Date of Patent: Apr. 23, 2019

(54) AMALGAMATING CODE VULNERABILITIES ACROSS PROJECTS

(71) Applicant: International Business Machines Corporation, Armonk, NY (US)

(72) Inventors: Elizabeth A. Holz, Seattle, WA (US); Iosif V. Onut, Ottawa (CA); Joni E. Saylor, Austin, TX (US); Hyun Kyu Seo, Austin, TX (US); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/366,042

(22) Filed: Dec. 1, 2016

(65) Prior Publication Data
US 2018/0157842 A1 Jun. 7, 2018

(51) Int. Cl.
*G06F 21/57* (2013.01)
*G06F 17/30* (2006.01)

(52) U.S. Cl.
CPC ...... *G06F 21/577* (2013.01); *G06F 17/30696* (2013.01)

(58) Field of Classification Search
CPC .......................... G06F 21/577; G06F 17/30696
USPC .......................................................... 726/25
See application file for complete search history.

(56) References Cited

U.S. PATENT DOCUMENTS

| | | | |
|---|---|---|---|
| 6,301,699 B1 | 10/2001 | Hollander et al. | |
| 7,392,545 B1 | 6/2008 | Weber et al. | |
| 8,321,941 B2 * | 11/2012 | Tuvell | G06F 21/56 726/24 |
| 8,997,221 B2 | 3/2015 | Dorrendorf et al. | |
| 9,336,397 B2 * | 5/2016 | Allen | G06F 21/577 |
| 9,519,780 B1 * | 12/2016 | Dong | G06F 21/564 |
| 2004/0006704 A1 * | 1/2004 | Dahlstrom | G06F 21/577 726/25 |
| 2005/0198051 A1 | 9/2005 | Marr et al. | |

(Continued)

OTHER PUBLICATIONS

"Managing application security risks to help protect your organization's critical data", IBM Corporation, IBM Security, Sep. 2016, 8 pages.

(Continued)

*Primary Examiner* — Michael S McNally
(74) *Attorney, Agent, or Firm* — Francis Lammes; Stephen J. Walder, Jr.; Jeffrey S. LaBaw

(57) ABSTRACT

Mechanisms are provided for correlating security vulnerability detection across multiple applications. The mechanisms perform a security vulnerability analysis of first source code of a first application, and identify, based on results of the security vulnerability analysis, a security vulnerability in a first portion of the first source code. The mechanisms associate characteristics of the security vulnerability with the first portion, and correlate the characteristics of the security vulnerability with second source code of a second application based on the association of the characteristics of the security vulnerability with the first portion. In addition, the mechanisms generate an output to a computing device of a consumer or contributor associated with the second source code identifying a presence of the security vulnerability in the second source code based on the correlation.

18 Claims, 11 Drawing Sheets

(56) References Cited

U.S. PATENT DOCUMENTS

| | | | |
|---|---|---|---|
| 2006/0218635 A1* | 9/2006 | Kramer | G06F 21/56 |
| | | | 726/22 |
| 2006/0236393 A1* | 10/2006 | Kramer | G06F 21/562 |
| | | | 726/23 |
| 2006/0259974 A1* | 11/2006 | Marinescu | G06F 21/56 |
| | | | 726/25 |
| 2010/0083380 A1* | 4/2010 | Harris | G06F 21/565 |
| | | | 726/24 |
| 2011/0173693 A1* | 7/2011 | Wysopal | G06F 11/3612 |
| | | | 726/19 |
| 2012/0137369 A1 | 5/2012 | Shin et al. | |
| 2012/0304244 A1* | 11/2012 | Xie | G06F 21/00 |
| | | | 726/1 |
| 2014/0280872 A1 | 9/2014 | Stickle | |

OTHER PUBLICATIONS

Csallner, Christoph et al., "Check 'n' Crash: Combining Static Checking and Testing", Proceedings of the 27th International Conference on Software Engineering (ICSE'05), May 15-21, 2005, 10 pages.

Hallem, Seth et al., "A System and Language for Building System-Specific, Static Analyses", ACM SIGPLAN Notices, vol. 37, No. 5, PLDI'02, Jun. 17-19, 2002, 14 pages.

* cited by examiner

IBM APPSCAN ENTERPRISE MONITOR

| Portfolio | Online Store 1.4 | id 7601 | id 6321 ✕ |

ID #6321  Application: Online Store 1.4  Finding Method: SAST  Scan Template: SAST-188a  Scan Instance: 4.1.13...
Cross Site Scripting
DTS ID
155X5  ./file/file1734.java                                     416
Status: Open 30 Days Old, Due Today   9.8 HIGH Calling Method
someMethod( )

```
59  function someMethod (fileName){
60      write(FILE_UPLOAD($file),fileName);
61  }
62  $uploaddir - '/var/www/uploads/';
63  $uploadfile - $uploaddir . basename($_FILES['userfile']['name']);
64  echo '<pre>';
65  if (move_uploaded_file($_FILES['userfile']['tmp_name'], $uploadfile)) {
66      echo 'File is valid, and was successfully uploaded.\n';
67  } else {
68      echo 'Possible file upload attack!\n';
69  }
70
```
          420

Source
FILE_UPLOAD($file)

Sink
write( )              418

Finding Description ▽
Comments (1)
[Add comment...]
                              [Add Comment]

4 Days ago: 6:40 AM
Please pay attention when
you're using derpApi
because when you use it
improperly, it derps out.
By John Doe
                    Delete | Edit
                                    426

☐ Singular Trace  ☐ Across Application (3)  ☐ Across Portfolio (9)

FILE_UPLOAD( )
[ $file ] ─── write( )
                ↘
                 $file
           422

[False Positive] [Ignore] [Send] [Done]  ←424

AMALGAMATING CODE VULNERABILITIES ACROSS PROJECTS

BACKGROUND

The present application relates generally to an improved data processing apparatus and method and more specifically to mechanisms for identifying code vulnerabilities in source code and amalgamating instances of vulnerabilities across projects, as well as identifying individuals responsible for the instances and notifying them of the security vulnerabilities and potential solutions.

Many organizations use software applications to run critical business processes, conduct transactions with suppliers and deliver sophisticated services to customers. While organizations depend on such applications to run their businesses, many invest little to no effort ensuring that they are adequately secure. While these organizations understand established security technologies for routine tasks such as networking and operations, and for managing security procedures such as access control and authentication, many struggle with implementing, managing and maintaining effective application security programs. However, in today's increasingly sophisticated threat landscape, the bar must be raised.

Since applications can compromise overall security across the entire organization, securing them needs to become a top priority. Security vvulnerabilities inadvertently introduced during application development can give hackers the ability to destabilize applications and obtain unfettered access to confidential information/data. This type of data loss can lead to a damaged brand reputation, loss of consumer confidence, disruption of business operations, interruption of the supply chain, threat of legal action and/or regulatory censure, etc.

Addressing application security can be quite challenging, especially for large organizations that manage thousands of applications. The task of ensuring application security typically falls on the shoulders of a small, overburdened security team.

Various mechanisms are generally known for identifying code vulnerabilities in source code. For example, U.S. Pat. No. 7,392,545, entitled "Systems and Methods for Detecting Software Security Vulnerabilities," describes a program scanner coupled to an analysis engine, where the program scanner is configured to identify vulnerability patterns in a software program and output an initial potential vulnerability list. The analysis engine is configured to apply rules to the initial potential vulnerability list to determine whether the potential vulnerabilities are in fact actual vulnerabilities or not.

Another mechanism, as described in U.S. Patent Application Publication No. 2011/0173693, entitled "Assessment and Analysis of Software Security Flaws," describes a security analysis and vulnerability testing mechanisms where the results are packaged and bound to the actual software. By linking the results to the software itself, downstream users of the software can access information about the software and make informed decisions about implementation of the software. Moreover, users may analyze the security risk across an entire system by accessing all of the reports associated with the executables running on the system and summarizing the risks identified in the reports. While this document describes an ability to summarize risks across an entire system, this is done by either performing separate scans of applications independently, or by using a benchmarking approach that generates security scores for applications independently, and providing an ability to generate a report of applications that match a specified application profile.

In general, security vulnerability analysis is limited to individual evaluation of applications and their specific security vulnerabilities.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system, for correlating security vulnerability detection across multiple applications. The method comprises performing, by the data processing system, a security vulnerability analysis of first source code of a first application, and identifying, by the data processing system, based on results of the security vulnerability analysis, a security vulnerability in a first portion of the first source code. The method further comprises associating, by the data processing system, characteristics of the security vulnerability with the first portion, and correlating, by the data processing system, the characteristics of the security vulnerability with second source code of a second application based on the association of the characteristics of the security vulnerability with the first portion. In addition, the method comprises generating, by the data processing system, an output to a computing device of a consumer or contributor associated with the second source code identifying a presence of the security vulnerability in the second source code based on the correlation. The method advantageously provides correlation of security vulnerabilities across multiple source codes based on the detection of the security vulnerability in a first portion of a first source code.

In some illustrative embodiments, generating the output to the computing device of the consumer or contributor includes automatically detecting, by the data processing system, a new version of the first source code indicated to remediate the security vulnerability. Generating the output to the computing device may further include automatically forwarding, by the data processing system, the new version of the first source code to the computing device in response to detecting the new version. Advantageously, these mechanisms allow for the automated distribution of source code that is a remediation of the security vulnerability previously detected.

In some illustrative embodiments, associating characteristics of the security vulnerability with the first portion includes performing, by the data processing system, a lookup operation in a source code repository and management (SCRAM) system, an identifier of the first source code to identify at least one of consumers of the first source code or contributors to the first source code. In some illustrative embodiments, generating an output to the computing device further includes sending the output to a computing device associated with one of a consumer or a contributor identified based on the lookup operation. Advantageously, these mechanisms allow for the identification of consumers/contributors associated with a source code in which a security vulnerability is found to be identified and notified of the security vulnerability.

In one or more illustrative embodiments, the SCRAM system may store entries for a plurality of source codes, each source code being mapped to contributor information identifying individual persons or organizations that contributed to the creation of the source code, and consumer information identifying individual persons or organizations that utilize the source code in one or more applications implemented by the consumer. In some illustrative embodiments, correlating, by the data processing system, the characteristics of the security vulnerability with second source code of a second application based on the association of the characteristics of the security vulnerability with the first portion includes generating, by the data processing system, an entry in a security vulnerability cataloging system that correlates the characteristics of the security vulnerability with one or more consumers or contributors associated with the first source code and the second source code. Again, these mechanisms advantageously provide functionality for correlating security vulnerabilities across multiple source codes and multiple consumers/customers of source codes.

With some illustrative embodiments, entries in the security vulnerability cataloging system may be bundled together based on at least one of similarities of characteristics of security vulnerabilities, similarity of consumers, or similarity of contributors. Advantageously, this provides functionality for grouping security vulnerability information based on similarities so that a user may be given a larger view of the effects of such security vulnerabilities.

In one or more illustrative embodiments, the output includes a graphical user interface in which security vulnerabilities in source code across an enterprise are depicted based on the bundling of the entries in the security vulnerability cataloging system. In some illustrative embodiments, the output includes a graphical user interface in which at least one of a plurality of consumers or contributors that are associated with a same or similar security vulnerability are depicted based on the bundling of entries in the security vulnerability cataloging system. In still other illustrative embodiments, the output includes a graphical user interface in which, for a specified consumer or contributor, all of the security vulnerabilities associated with the specified consumer or contributor are depicted based on the bundling of entries in the security vulnerability cataloging system. Moreover, with some illustrative embodiments, the output comprises a graphical user interface in which, for a specific source code, all of the security vulnerabilities associated with at least one of consumers or contributors associated with the specific source code, are depicted based on the bundling of entries in the security vulnerability cataloging system. Advantageously, these various outputs provide different views of the identified security vulnerabilities of source codes as well as their effects across multiple applications, consumers, and contributors.

In accordance with one or more illustrative embodiments, a computer program product is provided that comprises a computer readable storage medium having a computer readable program stored therein. The computer readable program, when executed by a data processing system, causes the data processing system to: perform a security vulnerability analysis of first source code of a first application; identify, based on results of the security vulnerability analysis, a security vulnerability in a first portion of the first source code; associate characteristics of the security vulnerability with the first portion; correlate the characteristics of the security vulnerability with second source code of a second application based on the association of the characteristics of the security vulnerability with the first portion; and generate an output to a computing device of a consumer or contributor associated with the second source code identifying a presence of the security vulnerability in the second source code based on the correlation. The computer program product advantageously provides correlation of security vulnerabilities across multiple source codes based on the detection of the security vulnerability in a first portion of a first source code.

In some illustrative embodiments, an apparatus is provided that includes a processor and a memory coupled to the processor. The memory includes instructions which, when executed by the processor, cause the processor to: perform a security vulnerability analysis of first source code of a first application; identify, based on results of the security vulnerability analysis, a security vulnerability in a first portion of the first source code; associate characteristics of the security vulnerability with the first portion; correlate the characteristics of the security vulnerability with second source code of a second application based on the association of the characteristics of the security vulnerability with the first portion; and generate an output to a computing device of a consumer or contributor associated with the second source code identifying a presence of the security vulnerability in the second source code based on the correlation. The apparatus advantageously provides correlation of security vulnerabilities across multiple source codes based on the detection of the security vulnerability in a first portion of a first source code.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A-4G illustrate various views of a graphical user interface through which a user obtains information about security vulnerabilities in code across a plurality of applications and projects and amalgamates common vulnerability information in accordance with one illustrative embodiment.

DETAILED DESCRIPTION

Figure 1:
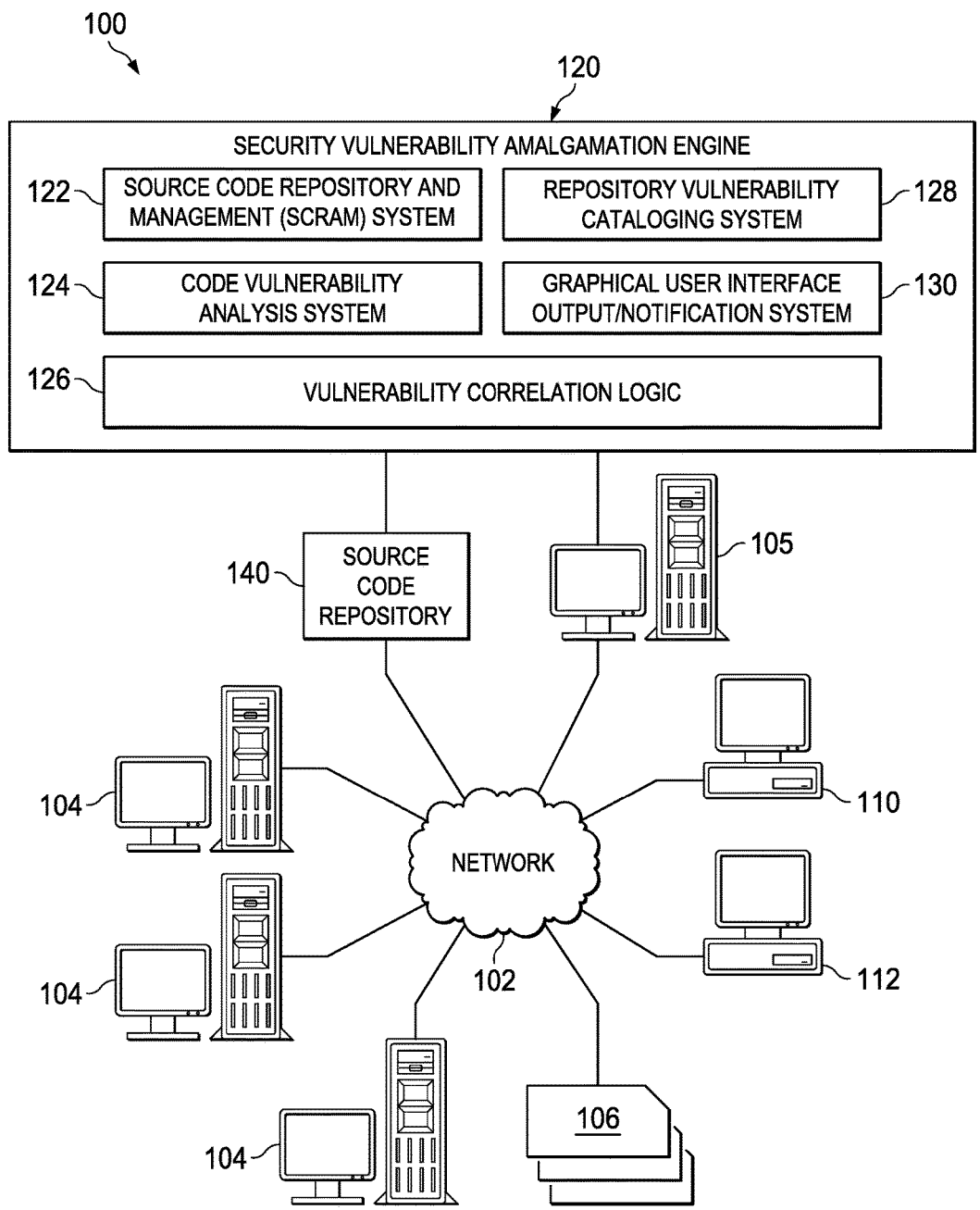
FIG. 1 depicts a schematic diagram of a distributed system in a computer network in which aspects of the illustrative embodiments may be implemented.

The illustrative embodiments provide mechanisms for identifying security vulnerabilities in source code and amalgamating security vulnerability types across multiple applications. Moreover, the mechanisms of the illustrative embodiments provide functionality for bundling instances of a security vulnerability across multiple applications of a portfolio of applications of one or more organizations, and notifying individuals responsible for (e.g., contributors), or utilizing (e.g., consumers), the various applications where the security vulnerability exists, potential solutions for the security vulnerability, locations where the potential solutions may be obtained, and the like. Furthermore, the illustrative embodiments may provide automated mechanisms for pushing solutions for identified security vulnerabilities to the contributors and/or consumers of the applications identified as associated with the security vulnerabilities.

It should be noted that the term "contributor" as used herein refers to any individual, organization, enterprise, or group of individuals, computing device, data processing system, or the like, that is a source of code or has modified code in which a security vulnerability is detected to be present. The term "consumer" refers to any individual, organization, enterprise, or group of individuals, computing device, data processing system, or the like that utilizes, copies, or otherwise implements code provided by a contributor, and in which a security vulnerability is detected to be present.

The term "security vulnerability" refers to a weakness in computer code which may allow an attacker to reduce a computing system's information assurance by compromising the integrity, availability, or confidentiality of the applications in which the computer code is present and/or their associated data. A security vulnerability is characterized by the intersection of a computing system's susceptibility or flaw, an attacker's access to that flaw, and the attacker's capability to exploit that flaw. Many security vulnerabilities have been identified in source code and standardized techniques for detecting their presence have been developed. Standardized methodologies for identifying these known security vulnerabilities that have been devised include the Common Vulnerabilities and Exposures (CVE) initiative which provides a dictionary of common names and identifiers for publicly known information security vulnerabilities.

Modern programming practice combines source code from a variety of sources, e.g., open source code, third party source code, and locally developed source code. The source code (or simply referred to as "code" herein) from these various sources are all crafted into a single, or multiple related, software packages. As security vulnerabilities are discovered, it is increasingly difficult to identify if and where in an organization's code base those security vulnerabilities may reside. Furthermore, as organizations increasingly adopt code analysis methods, they are left with manual methods to identify where the code has been used and, secondly, who in their organization may be responsible for remediating the security vulnerabilities once they are identified and their solution is generated.

In organizations where code is shared among projects, e.g., software development projects, once a vulnerability is discovered, there is no automated mechanism for identifying the other projects that may contain that code where the security vulnerability was discovered. Moreover, there is no automated mechanism for identifying who is responsible for the maintenance of this code in the various projects. This is essentially a manual process, if done at all, and thus, is an error prone process, raising an organization's risk posture as well as the risk posture of the organization's software products.

The illustrative embodiments provide mechanisms for automatically scanning code for a plurality of applications and identifying a security vulnerability in the source code of an application component of one of those applications. The security vulnerability is associated with the application component, e.g., the portion of source code, such as a function, class, method, routine, sub-routine, or the like. Moreover, the presence of the application component in another one of the applications in the plurality of applications is identified via a source code repository that stores information about the various source code of applications and the particular contributors and consumers of those source codes. The security vulnerability is associated with the other application and information about the presence of the security vulnerability in the identified applications is provided to personnel/organizations (e.g., users, consumers, and/or contributors) associated with the applications, based on a correlation of personnel/organization information with the identified applications.

In addition, some illustrative embodiments provide mechanisms for allowing users of source code security scanners to view overarching security vulnerabilities caused by common code (e.g., frameworks, libraries, copied and pasted code, etc.) across their portfolio of source code for various applications. The view allows for the user to also see the personnel or organizations that are associated with the applications and initiate communications with those personnel or organizations. Thus, the illustrative embodiments correlate security vulnerabilities in source code with various instances of that source code present in a plurality of applications, potentially across multiple organizations, development teams, or the like, with regard to developers, maintainers, and customers or users of the applications, and further correlates the instances of that source code with the identified security vulnerabilities with individuals or organizations associated with those instances.

Views of this information are presented to a user and/or communications may be automatically, or semi-automatically, sent to the individuals or organizations associated with those instances. Moreover, additional functionality may be provided for correlating the security vulnerabilities with solutions for the security vulnerabilities and presenting that information in the communications. This solution information may be suggestions as to how to avoid the security vulnerabilities, may be to provide information about other code in which the security vulnerability has been eliminated, as well as the location of that code, or the like. In some cases, the fix for the security vulnerability may be automatically pushed to the individuals or organizations for implementation into their instances of the source code where the security vulnerability is present.

In some illustrative embodiments, the identification of security vulnerabilities in source code may be performed using an application scanner, such as IBM Security AppScan™, available from International Business Machines (IBM) Corporation of Armonk, N.Y. IBM Security AppScan provides mechanisms for performing automatic application security vulnerability testing and leverages advanced Dynamic Application Security Testing (DAST) capabilities. While an IBM Security AppScan™ suite of tools may be utilized, other application scanners may also be utilized with various embodiments without departing from the spirit and scope of the present invention.

In general, the application scanner scans the source code of the applications and compares the source code against a plurality of known insecure coding techniques and implementations. The comparison may be implemented in various ways including, but not limited to, code pattern matching, heuristic analysis, function analysis, parameter analysis, boundary failure analysis, etc. The resulting output of the application scanner is a set of flagged portions of source code that have been determined to be potentially insecure, information regarding the nature of the insecurity of the flagged portion of code, possibly standard vulnerability tracking identifiers, such as the Common Vulnerability Enumeration (CVE) identifier, alternate and/or preferable techniques for coding the particular flagged portion of source code, identification of potential patches for the flagged portion of source code, and the like. As many application scanners are generally known in the art, a more detailed explanation will not be provided herein.

In addition to the application scanner, the illustrative embodiments further include a source code repository and management (SCRAM) system. The SCRAM system stores and tracks versions of source code, identifies code authors associated with code submissions, identifies other source code packages used by a particular application development project. The SCRAM system provides mechanisms to identify what, when, and who has submitted or modified a particular set of source code and is consuming particular source code. Thus, whereas the code vulnerability analysis system or application scanner provides information about the security vulnerabilities found in individual applications, the SCRAM system provides a broader view of the instances of source code in various applications across a plurality of projects, organizations, etc.

The illustrative embodiments further provide a repository vulnerability cataloging system that correlates the output from an application scanner with that of the SCRAM system to generate catalog entries of identified insecure portions of source code, with the corresponding code analysis results generated by the application scanner, correlated with consumer and contributor information obtained from the SCRAM system. The repository vulnerability cataloging system provides functionality for identification, tracking, and notification of contributors and consumers of potentially insecure source code across application development projects.

Entries in the repository vulnerability cataloging system storage for correlating the application scanner identified security vulnerabilities with the consumer/contributor information may comprise a variety of different types of information stored in corresponding data structures. For example, each entry may comprise specific location information for identifying the specific location of the vulnerable code, identifiers of the contributors and consumers associated with the vulnerable code, a Common Vulnerabilities and Exposures (CVE) # or other standard identifier associated with the security vulnerability, the location or actual remediation of code/patches/etc. for the security vulnerability, and the like. The location information for the vulnerable code may take many different forms depending on the particular implementation. For example, the location information may be provided in the form of a Uniform Resource Locator (URL) of the source code in question, a directory path, or any other form that uniquely identifies the location of a particular portion of source code.

Security vulnerabilities found and cataloged using the mechanisms of the repository vulnerability cataloging system may be bundled together based on similarity of the security vulnerability, similarity of the consumers, similarity of the contributors, or the like. This facilitates presenting various types of information to a user and/or the consumers/contributors. For example, a user may wish to see information across an enterprise regarding which consumers/customers are generating and/or encountering the same types of security vulnerabilities and thus, bundling or clustering security vulnerabilities having similar characteristics may be performed. The similar characteristics may be the same security vulnerability name, the same security vulnerability type, the same particular file, source code, routine, method, sub-routine, etc., in which the security vulnerability is present, or any other characteristic of the security vulnerabilities that the user wishes to obtain a grouped or bundled information representation. Moreover, in some cases, the user may wish to view all of the security vulnerabilities identified for a particular consumer or a particular customer, e.g., for a particular development team, the user may wish to view all of the security vulnerabilities associated with that development team across a plurality of application development projects. As another example, the user may wish to view the security vulnerabilities across a plurality of consumers of source code provided by a particular contributor. Various views of information regarding security vulnerabilities that span a plurality of applications, a plurality of consumers, and/or a plurality of contributors may be generated without departing from the spirit and scope of the present invention.

In addition, the illustrative embodiments provide mechanisms for generating notifications and/or graphical user interface outputs that are transmitted to other computing devices via one or more data networks based on the identified security vulnerabilities and the correlation of these security vulnerabilities with SCRAM system information identifying consumers and contributors to source code in which these security vulnerabilities are found. The notifications may be provided via any known or later developed data based messaging system and protocol, such as instant message, electronic mail, proprietary security vulnerability messaging mechanisms, or the like. The notifications may provide various information about the security vulnerability including the identity of the security vulnerability, the nature or type of the security vulnerability, an identifier of the source code in which the security vulnerability was found (e.g., what function, method, sub-routine, etc. the security vulnerability was found in), the location of any solutions, patches, or fixes for the security vulnerability, and the like. In some illustrative embodiments, where the security vulnerability is found in source code that is shared by multiple consumers and/or contributors, the notifications may be sent to each such consumer/contributor and may be customized to the particular application(s) with which that consumer/contributor is associated and in which the security violation is known to be present to thereby identify which applications that consumer/contributor is associated with and which have the identified security vulnerability.

With regard to embodiments in which a graphical user interface (GUI) output is provided, and through which a user may interact to obtain information about security vulnerabilities, various GUI views may be presented for representing information about security vulnerabilities across a plurality of applications and/or projects, organizations, and the like. For example, in some views, a graphical/textual representation of the security vulnerability and the various applications in which the security vulnerability has been detected across multiple application development teams, code authors, organizations, consumers, and the like, may be generated along with information about the source code portions, e.g., routines, methods, sub-routines, etc., in which the security vulnerability is found and which may be replicated in these various applications, may be provided. Moreover, statistical information regarding how long it takes to perform remediation activities for the security vulnerability, the number of application scans over which the security vulnerability has been detected in applications monitored by the system, the number of times the security vulnerability has reoccurred (e.g., the security vulnerability is remediated and then reoccurs), and the like may be provided. In some cases, the GUI may present information regarding the most likely reason for the security vulnerability and the most likely result of that security vulnerability.

The GUIs presented may provide various GUI elements for drilling down into specific information about specific security vulnerability instances as well as providing user feedback and commentary about the specific security vulnerability instances. For example, in some cases, a user may select an instance of a security vulnerability and drill down into the specific information about that instance of the security vulnerability. The user may provide user feedback indicating whether the instance is a false positive, should be ignored, a notification should be sent to the contributor and/or consumers of the source code in which the security vulnerability is found, or the like. Moreover, the user may add comments about the security vulnerability which may then be associated with the instance and made viewable by other users, contributors, and/or consumers.

In some cases, the GUIs may present GUI elements that allow a user to group instances of a security vulnerability and obtain information about applications in which the security vulnerability is present across a portfolio of applications. Other GUI elements may be provided for performing various other groupings of security vulnerabilities, such as based on a selected consumer, a selected contributor, or the like, and presenting various views of the security vulnerability information across a portfolio, across an organization, or the like.

Thus, the illustrative embodiment provide mechanisms for not only obtaining security vulnerability information for a single application or source code instance, but further provides mechanisms for correlating security vulnerability information across entire portfolios of applications, across organizations, across contributors and/or consumers of source code, and the like. As a result, security vulnerability information of a much larger scale is made available for viewing and processing. The processing of such large scale security vulnerability information may include the sending of notifications to consumers/contributors, the automated patching/fixing of multiple instances of security vulnerabilities across consumers/contributors, organizations, application development projects, and the like, the identification of flagging of source code instances where security vulnerabilities are present across portfolios, consumers and/or contributors along with links to potential patches or fixes for such security vulnerabilities, and the like. Hence, an enterprise wide security vulnerability amalgamation solution is provided.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. In particular, the illustrative embodiments may be implemented in distributed data processing systems in which code development projects and/or code implementation across a large distributed enterprise or organization is implemented. In some illustrative embodiments, the mechanisms of the illustrative embodiments provide for the correlation of security vulnerabilities across multiple applications of multiple code development projects and/or code implementations across the distributed enterprise or organization. However, it should be appreciated that the mechanisms of the illustrative embodiments may also be utilized on a single computing device or relatively small set of computing devices in which multiple instances of source code may be provided such that security vulnerabilities among the multiple instances of course code may be correlated.

Figure 2:
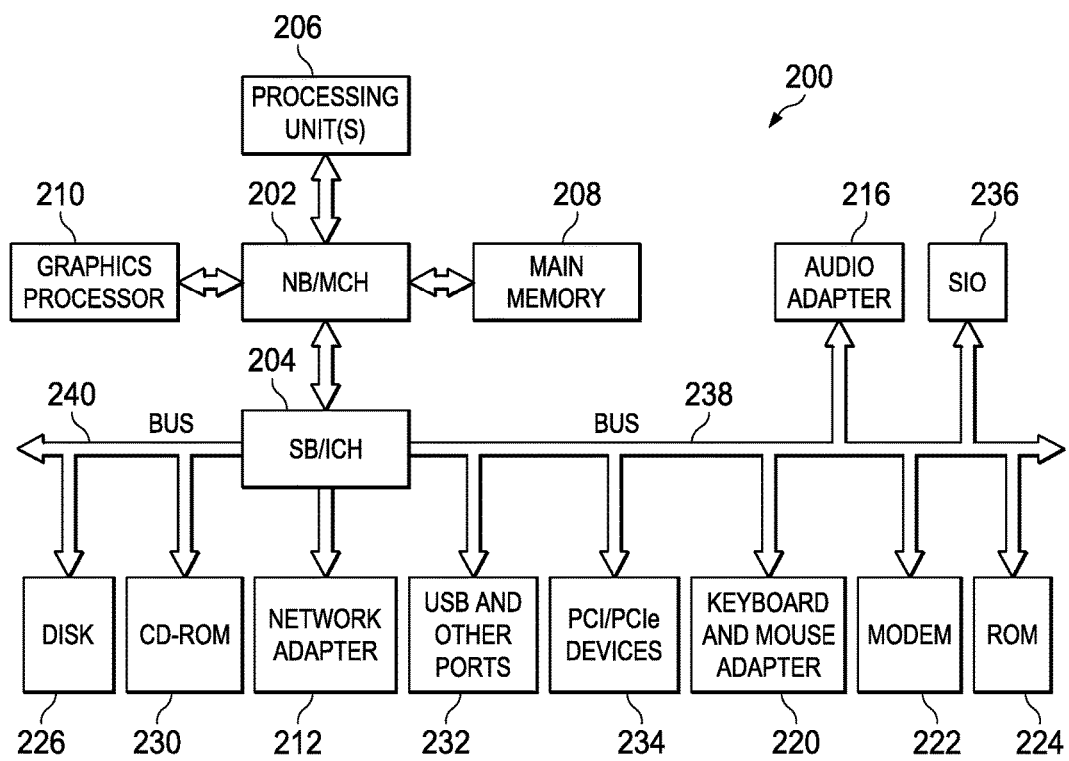
FIG. 2 is a block diagram of an example data processing system in which aspects of the illustrative embodiments are implemented.

In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, servers 104 and server 105 are connected to network 102 along with storage system 106. In addition, clients 110 and 112 are also connected to network 102. These clients 110 and 112 may be, for example, personal computers, network computers, or the like. In the depicted example, one or more of servers 104 and/or 105 may provide data, such as boot files, operating system images, and applications to the clients 110 and 112. Clients 110 and 112 are clients to servers 104 and/or 105 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 105, may be specifically configured to implement a security vulnerability amalgamation engine 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the correlation of security vulnerabilities in source code among a plurality of applications and across large scale organizations and enterprises such that notifications and interfaces for obtaining information about security vulnerabilities may be obtained and made viewable. In this way, the security of a distributed set of applications that share source code or otherwise implement similar coding techniques that suffer from similar security vulnerabilities may be improved.

The security vulnerability amalgamation engine 120 is implemented on one or more computing devices 105 (comprising one or more processors and one or more memories, and potentially any other computing device elements generally known in the art including buses, storage devices, communication interfaces, and the like) connected to the computer network 102. As noted above, the network 102 includes multiple computing devices 104, 105, 110, and 112 in communication with each other and with other devices or components via one or more wired and/or wireless data communication links, where each communication link comprises one or more of wires, routers, switches, transmitters, receivers, or the like. The security vulnerability amalgamation engine 120 and network 102 enables the scanning of source code of a plurality of applications for security vulnerabilities and further provides functionality for the correlation of security vulnerability information with contributor and consumer information across a distributed environment where the security vulnerabilities and/or the source code may be replicated. Moreover, the security vulnerability amalgamation engine 120 provides functionality for providing notifications to contributors/consumers, providing interfaces through which amalgamated security vulnerability information may be accessible, and/or functionality for automating the distribution or access to security vulnerability solutions.

It should be appreciated that the applications and/or source code upon which the security vulnerability amalgamation engine 120 operates may be created, modified, or otherwise provided by users using client computing devices 110, 112 and operating on source code stored in one or more servers 104, storage system 106, or the like. For example, the servers 104 may provide development and/or deployment tools for developing/deploying applications. Other embodiments of the security vulnerability amalgamation engine 120 may be used with components, systems, subsystems, and/or devices other than those that are depicted herein.

The security vulnerability amalgamation engine 120 is configured to implement a functionality for amalgamating security vulnerability information across multiple applications. For example, the security vulnerability amalgamation engine 120 receives input from the network 102 where this input may be source code for scanning by the security vulnerability amalgamation engine 120, user input requesting information regarding the security vulnerabilities of source code, user input to graphical user interfaces (GUIs) presented by the security vulnerability amalgamation engine 120, and the like In addition, the security vulnerability amalgamation engine 120 may send outputs to the network 102 for routing to various ones of the computing devices 104, 110, and 112, as well as storage system 106. These outputs may be notifications, graphical user interface (GUI) data, data for storage into a database or other data structure of the storage system 106, or the like. In one embodiment, some or all of the inputs to the security vulnerability amalgamation engine 120 are routed through the network 102. Some of the computing devices 104 include devices storing portions of a source code repository (which is shown as a separate entity 140 in FIG. 1 for illustrative purposes only). Portions of the source code repository 140 may also be provided on one or more other network attached storage devices or systems, such as storage system 106, or in one or more databases or other computing devices not explicitly shown in FIG. 1. The network 102 includes local network connections and remote connections in various embodiments, such that the security vulnerability amalgamation engine 120 may operate in environments of any size, including local and global, e.g., the Internet.

As shown in FIG. 1, the security vulnerability amalgamation engine 120 includes logic implemented in specialized hardware, software executed on hardware, or any combination of specialized hardware and software executed on hardware, for implementing a source code security vulnerability identification, correlation, cataloging, and information accessing/notification functionalities. The security vulnerability amalgamation engine 120 comprises source code repository and management (SCRAM) system 122, code vulnerability analysis system 124, vulnerability correlation logic 126, repository vulnerability cataloging system 128, and GUI output/notification system 130. These elements provide the logic for implementing various corresponding functions of the security vulnerability amalgamation engine 120 as described hereafter. It should be appreciated that any functionality described hereafter that is not attributed to a specific system 122-130 may be implemented in logic provided in the security vulnerability amalgamation engine 120. In addition, the security vulnerability amalgamation engine 120 provides logic for controlling and orchestrating the operation of the various systems 122-130 as well as their interaction with one another.

The SCRAM system 122 comprises logic for registering and managing source code in the source code repository 140 which is generated by users or otherwise provided by users for management and checking by the security vulnerability amalgamation engine 120. For example, the security vulnerability amalgamation engine 120 may be implemented as part of a distributed data processing system that is associated with a particular organization. As such, the organization may utilize the security vulnerability amalgamation engine 120 with each portion of source code generated or otherwise provided by employees or users associated with the organization, and which is stored in the source code repository 140. For example, the security vulnerability amalgamation engine 120 may be integrated with code development environment tools utilized by users of computing devices 104, 110, or 112 to develop applications. Moreover, the organization may have policies that require that developers of applications have their code analyzed by the security vulnerability amalgamation engine 120 and thus, when the security vulnerability amalgamation engine 120 operates on the source code of the application, the SCRAM system 122 may add the source code to the source code repository 140 and generate corresponding data structures for performing correlation operations as discussed hereafter. In some cases, the source code may be associated with third parties, may be open source or otherwise provided external to the organization, but may be registered with the security vulnerability amalgamation engine 120 by a user and subjected to the analysis performed by the security vulnerability amalgamation engine 120.

The SCRAM system 122 generates data structures that are used to correlate source code with contributors of the source code and consumers of the source code. These data structures may be application mapping data structures that map the various portions of source code to their contributors and consumers. The SCRAM system 122 tracks all actions made by users (human or computing devices), such as "checkin" and "checkout" actions (where checkout and checkin are concepts similar to a library checkout and checkin procedure), linking contributors and consumers with their associated projects, i.e. source code. A code "checkout" followed by a code "checkin" of the same code assets identifies the user as a consumer of the checked out code. If new source code, or a new version of source code, is added to a project, then the user may be identified as a contributor.

In some embodiments, the SCRAM system 122 may examine metadata of a portion of code, comments in the code, or other designators of authors of portions of code to determine the contributors to the portion of code. For example, metadata associated with the code may indicate that the code was originally generated by a programmer "Person A" or development team "Dev A", and may also indicate a version history that indicates persons, teams, or other organizations (referred to collectively as "authors") that may have modified the original source code. All of these authors may be associated as contributors to the source code and thus, may be parties that should be notified if a security vulnerability is found to exist in the source code.

The code vulnerability analysis system 124 provides one or more code analyzers, such as application scanners (e.g., IBM Security AppScan™) which scans code of an application and identifies any instances of potential security vulnerabilities that may be present in the source code. The analyzers analyze various aspects of the source code or apply different techniques for analyzing the source code to identify coding techniques, parameter usage, code patterns, function calls, and other known security vulnerability patterns that may represent vulnerabilities that an attacker may exploit to undermine the security of a computing system implementing the source code. The code vulnerability analysis system 124 may generate characteristic information regarding each of the security vulnerabilities found in the source code of an application analyzed by the code vulnerability analysis system 124. In generating characteristic information regarding the security vulnerabilities, the code vulnerability analysis system 124 generates information include the name of the security vulnerability, the name of the function, method, class, routine, etc., in which the security vulnerability is found, the calling routine, method, or the like, the input/output parameters, a CVE # if possible, and the like. The particular characteristics that are generated depends on the type of code vulnerability analysis mechanisms implemented, such as which application scanners are employed. One or more of these characteristics may be utilized to generate a fingerprint for the security vulnerability which may be used to track other portions of code that may include the same security vulnerability, e.g., a hash or string that is representative of the security vulnerability.

The vulnerability correlation logic 126 correlates the consumer/contributor information for source code generated and maintained in data structures of the SCRAM system 122 with the security vulnerabilities found by the code vulnerability analysis system such that the contributors/consumers of source code in which there are security vulnerabilities may be identified. The vulnerability correlation logic 126 may generate a vulnerable code report data structure that includes the correlated information. This correlated information in the vulnerable code report data structure may be provided to the repository vulnerability cataloging system 128 which amalgamates the vulnerable code report data structure information for the same code security vulnerabilities such that for each security vulnerability a listing of the contributors and consumers of source code implementing the portions of code having the security vulnerabilities may be maintained in a repository vulnerability catalog by the repository vulnerability cataloging system 128. Security vulnerability characteristic information may also be maintained in the entries of the repository.

In addition, when a new version of source code is generated and registered in the SCRAM system 122, a contributor to the new version of source code may designate the new version of source code to be "fixed", "remediated", or the like. This new version of the source code may be linked to the source code in which security vulnerabilities were found by project identifier or other characteristics mapping source code with one another and with consumers/contributors. The location of this "fixed" or "remediated" version of source code may thus but stored and associated with the security vulnerability as a security vulnerability characteristic in the entries of the repository for that security vulnerability in the repository vulnerability cataloging system 128.

In still further illustrative embodiments, the SCRAM system 122 may implement an automated monitoring functionality that monitors the SCRAM system 122 for security vulnerability status changes, e.g., source code marked as having a security vulnerability and then subsequently marked as having been remediated. In such a case, the SCRAM system 122, potentially with the use of the GUI output/notification system 130 as described hereafter, may send notifications to consumers/contributors of the remediation of a previously identified security vulnerability with which they are associated and the location of the fixed or remediated source code, as determined from the automated monitoring of the SCRAM system 122.

In other illustrative embodiments, a fully automated distribution of remediated source code may be performed using an automatic "checkin" of the remediated code to the consumers of the source code previously identified as having a security vulnerability. The "checkin" and "checkout" mechanisms are described above in the context of identifying contributors and consumers of source code but may also be used to automatically push the remediated source code to consumers and/or contributors that were associated with the vulnerable source code that is now fixed.

The GUI output/notification system 130 provides logic for generating GUIs and/or notifications through which security vulnerability information may be provided to users (such as system administrators and the like), contributors, and consumers. The GUIs provide visualizations of security vulnerability information as well as amalgamations of security vulnerability information along various groupings of consumers, contributors, and/or types of security violations, which may be drilled down into to obtain various levels of information as well as selection of aspects of security vulnerabilities for further investigation. The notifications may be sent to contributors and consumers to inform them of characteristics of security vulnerabilities associated with applications that they have contributed to or consume as well as potential fixes or patches for such security vulnerabilities. The GUI output/notification system 130 may interact with users via their computing devices 104, 110, and 112 via network 102 when the users provide input to the GUIs or notifications and responds with updated GUIs/notifications.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for execution by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the security vulnerability amalgamation engine.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
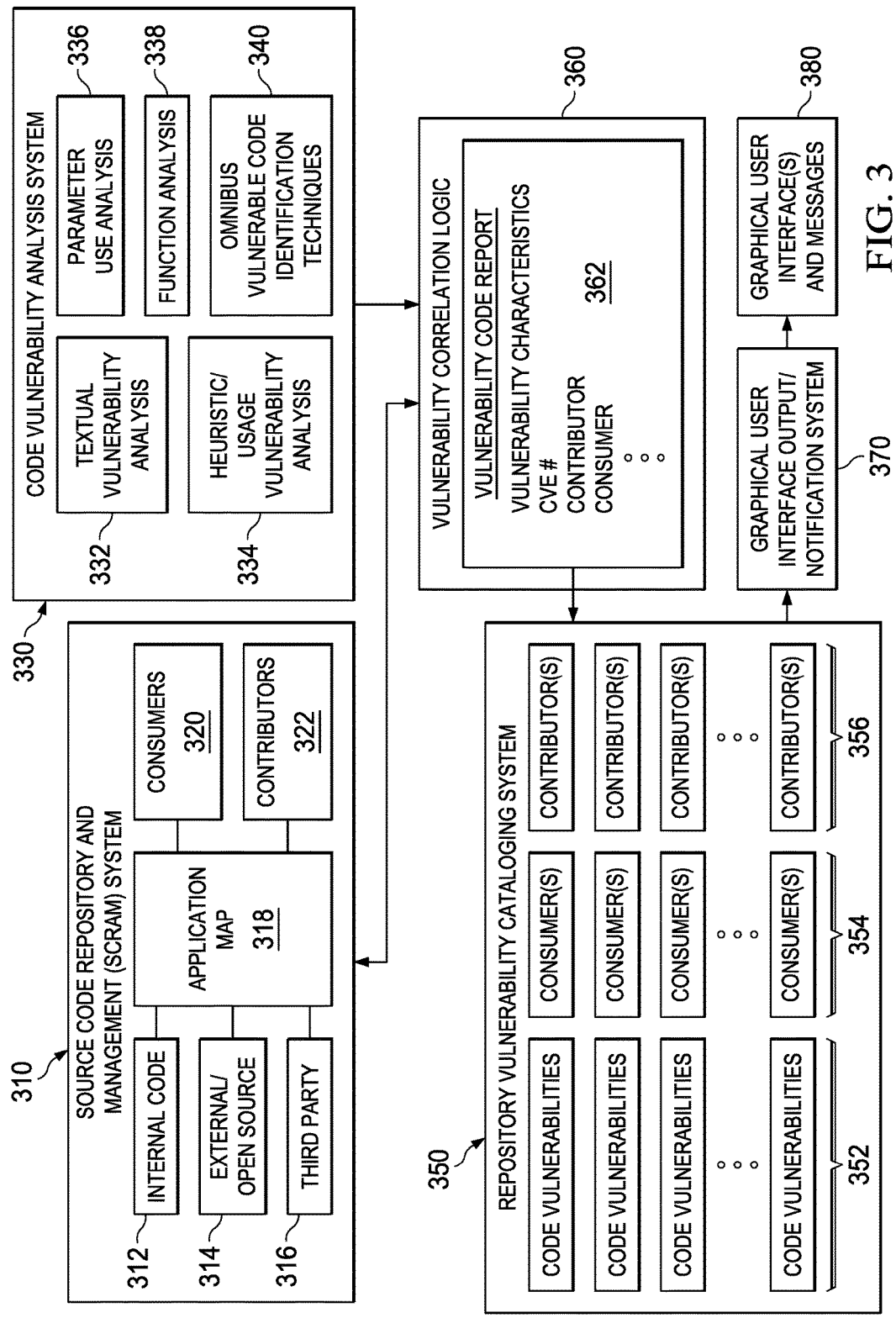
FIG. 3 is an example block diagram illustrating an operation of the primary operational elements of one illustrative embodiment.

FIG. 3 is an example block diagram illustrating an operation of the primary operational elements of one illustrative embodiment. The operational elements shown in FIG. 3 may be implemented as logic in a security vulnerability amalgamation engine, such as engine 120 in FIG. 1. The operational elements may comprise software, hardware, or any combination of software and hardware of a data processing system or computing device, for example. As such, similar elements shown in FIG. 3 as those with similar names in FIG. 1 may perform similar operations.

As shown in FIG. 3, the source code repository and management (SCRAM) system 310 comprises logic that maps various types of source code 312-316 with identifiers of consumers 320 and contributors 322 and generates an application mapping data structure 318 that maintains that mapping. The application mapping data structure 318 may be updated dynamically as new contributors 322 and consumers 320 of source code 312-316 are identified by the SCRAM system 310. The source code may originate from various sources including internal source code 312 which is generated by users, employees, programmers, or the like, employed by an organization that implements the security vulnerability amalgamation engine. The source code may also come from external sources such as open source 314 or even third party sources 316, where a third party source is an organization that provides their source code in exchange for financial compensation as opposed to open source code which is available without financial compensation being required.

The SCRAM system 310 thus, provides the information for correlating contributors 322 and consumers 320 with portions of source code. The correlation may be done, as noted above, by analyzing metadata, comments, and the like, associated with the source code itself, such as version histories and the like, and thereby identify individuals, groups, and/or organizations responsible for generating and/or modifying the source code, i.e. the contributors 322. Moreover, as noted above, a "checkin" and "checkout" monitoring mechanism may be utilized to identify contributors and consumers of source code.

For example, such a mechanism may track which entity (e.g., user, organization, computing device, etc.) checked out, forked, or cloned a particular version of source code, as well as correlate the source code in the SCRAM system 310 consumer repositories 320 that are sourced from other SCRAM managed code packages belonging to other entities, e.g., contributors 322. That is, the source code 312-316 may be organized into projects or packages, each project/package having an owner or owners, e.g., a contributor 322. That source code, and related elements (images, text, web templates, executables, documentation, notes, etc.), are organized into a hierarchical file like system. All operations, updates, checkouts, checkins, etc. are tracked by the SCRAM system 310 such that each source code element has an associated version history. The management portion of the SCRAM system 310 also associates and tracks who has checked out (consumers 320) what source code and from whom (contributors 322). The task is then to correlate identified code vulnerabilities and propagate those information about those vulnerabilities (this disclosure) to all affected contributors and consumers.

The code vulnerability analysis system 330 provides information about the security vulnerabilities found in a portion of source code, such as the source code of an application that is being scanned by the analysis logic of the code vulnerability analysis system 330. Various types of analysis and techniques for evaluating the source code may be used to identify security vulnerabilities in the source code which may be exploitable by attackers. For example, textual string pattern matching may be performed by the textual vulnerability analysis logic 332 against known textual strings associated with security vulnerabilities. Similarly, heuristic algorithms and usage, such as data flow, analysis 334 may be utilized to identify security vulnerabilities in the source code of a scanned application. Moreover, parameter usage 336, function analysis 338, and other various vulnerable code identification techniques 340 may be utilized to identify portions of source code within a scanned application that may comprise potential security vulnerabilities.

These various types of analysis are generally known in the art and thus, a more detailed explanation of each is not provided herein. Such analysis is often provided by application scanners, such as the IBM Security AppScan™ available from IBM Corporation, as previously noted above. In general, the code vulnerability analysis system 330 scans the source code of the applications and compares the source code against a plurality of known insecure coding techniques and implementations using one or more of the various analysis tools 332-340, which includes, but is not limited to, tools for performing code pattern matching, heuristic analysis, function analysis, parameter analysis, boundary failure analysis, and the like.

The output of the code vulnerability analysis system 330 is either an indication that the application source code does not have any identified security vulnerabilities, or an output that includes the identification of at least one security vulnerability present in the source code of the application, e.g., a set of flagged portions of source code of the application that have been determined to be potentially insecure. In the case where the output indicates at least one security vulnerability present in the source code of the application, each security vulnerability is associated with a corresponding portion of the application source code, e.g., the function, routine, class, method, sub-routine, etc., in which the security vulnerability was identified. For purposes of the following description and ease of understanding, it will be assumed that only a single security vulnerability is identified through the code vulnerability analysis, however it should be appreciated that principles set forth herein may be applied to multiple security vulnerabilities found in one or more portions of application source code of one or more applications.

The resulting output of the code vulnerability analysis system 330 further comprises security vulnerability characteristic information regarding the nature of the insecurity of the corresponding flagged portion of code, standard vulnerability tracking identifiers, such as the Common Vulnerability Enumeration (CVE) identifier for the security vulnerability if any, alternate and/or preferable techniques for coding the particular flagged portion of source code, identification of potential patches for the flagged portion of source code, and the like. For example, the code vulnerability analysis system 330 may have a repository (not shown) of knowledge, or a knowledge base, that stores information regarding various security vulnerabilities and the location of the fixes and patches for these security vulnerabilities, or information regarding how to correct such security vulnerabilities. A lookup operation may be performed by the code vulnerability analysis system 330 in response to detecting a security vulnerability in scanned application source code, such as based on a security vulnerability name, CVE identifier, or other unique identifier of the security vulnerability and the corresponding information, patches/fixes, and the like, may be retrieved and included in the output of the code vulnerability analysis system 330. In general, the information regarding the security vulnerability identified by the code vulnerability analysis system 330 is referred to herein as security vulnerability characteristics.

The output of the code vulnerability analysis system 330, comprising the various security vulnerability characteristics for the security vulnerability, is provided to the vulnerability correlation logic 360. The vulnerability correlation logic 360 correlates the security vulnerability characteristics of the security vulnerability with source code and consumer/contributor mapping information in the application mapping data structures 318 of the SCRAM system 310. That is, as noted above, the security vulnerability is associated with a portion of source code in the application. Information about this portion of source code may be used to perform a lookup of consumer/contributor information for that portion of source code in the application mapping data structures 318. Thus, for example, the application mapping data structures 318 may store information that maps each method of source code with the contributors 322 that contributed to the generation and modification of the method, and with consumers that utilize the method in their applications. The vulnerability correlation logic 360 may communicate with the SCRAM system 310 to perform a lookup operation, based on the method (the term "method" being used in this context to refer to methods in object oriented programming) in which a security vulnerability is detected by the code vulnerability analysis system 330, to identify the contributors 322 and consumers 320 of that method. This information is maintained in a vulnerable code report data structure 362 which correlates the security vulnerability characteristics with the contributors 322 and consumers 320.

The illustrative embodiments further provide a repository vulnerability cataloging system 350 that correlates the output from the code vulnerability analysis system 330 and the SCRAM system 310 to generate catalog entries of identified insecure portions of source code, with the corresponding code analysis results correlated with consumer and contributor information obtained from the SCRAM system 310. The information for generating this information may be obtained from the vulnerability code report 362. The repository vulnerability cataloging system 350 may amalgamate security vulnerability information for a plurality of instances of the same security vulnerability as well as a plurality of different security vulnerabilities, as indicated in vulnerability code reports generated by the vulnerability correlation logic 360. The repository vulnerability cataloging system 350 may further comprise logic that provides functionality for identification, tracking, and notification of contributors and consumers of potentially insecure source code across application development projects, organizations, development teams, and the like.

Entries in the repository vulnerability cataloging system storage for correlating the code vulnerability analysis system 330 identified security vulnerabilities 352 with the consumer/contributor information 354, 356 may comprise a variety of different types of information stored in corresponding data structures. For example, each entry may comprise specific location information for identifying the specific location of the vulnerable code, identifiers of the contributors and consumers associated with the vulnerable code, a Common Vulnerabilities and Exposures (CVE) # or other standard identifier associated with the security vulnerability, the location or actual remediation of code/patches/ etc. for the security vulnerability, and the like.

The entries in the repository vulnerability cataloging system 350 may be used to bundle together security vulnerability information based on common characteristics or attributes of the security vulnerabilities. These common characteristics or attributes may be a common contributor, a common consumer, a common security vulnerability, similar security vulnerabilities, common source code location, common application development project, common organization, or the like. In short, any common characteristic or attribute of a security vulnerability that may be identified in entries of the repository vulnerability cataloging system 350 may be utilized to generate bundles of security vulnerability information. These bundles may be generated dynamically in response to user requests for such information, such as may be received via GUIs 380 generated by the GUI output and/or notification system 370.

The bundling, or grouping, of security vulnerability information facilitates presenting various types of information to a user and/or the consumers/contributors. For example, a user may wish to see information across an enterprise regarding which consumers/customers are generating and/or encountering the same types of security vulnerabilities and thus, bundling or clustering security vulnerabilities having similar characteristics may be performed. The similar characteristics may be the same security vulnerability name, the same security vulnerability type, the same particular file, source code, routine, method, sub-routine, etc., in which the security vulnerability is present, or any other characteristic of the security vulnerabilities that the user wishes to obtain a grouped or bundled information representation. Moreover, in some cases, the user may wish to view all of the security vulnerabilities identified for a particular consumer or a particular customer, e.g., for a particular development team, the user may wish to view all of the security vulnerabilities associated with that development team across a plurality of application development projects. As another example, the user may wish to view the security vulnerabilities across a plurality of consumers of source code provided by a particular contributor. Various views of information regarding security vulnerabilities that span a plurality of applications, a plurality of consumers, and/or a plurality of contributors may be generated without departing from the spirit and scope of the present invention.

The GUI output and/or notification system 370 comprises logic for generating notifications and/or graphical user interface (GUI) outputs 380 that are transmitted to other computing devices via one or more data networks based on the identified security vulnerabilities and the correlation of these security vulnerabilities with SCRAM system 310 information identifying consumers 320 and contributors 322 to source code in which these security vulnerabilities are found. The notifications may be provided via any known or later developed data based messaging system and protocol, such as instant message, electronic mail, proprietary security vulnerability messaging mechanisms, or the like. The notifications may provide various information about the security vulnerability including the identity of the security vulnerability, the nature or type of the security vulnerability, an identifier of the source code in which the security vulnerability was found (e.g., what function, method, sub-routine, etc. the security vulnerability was found in), the location of any solutions, patches, or fixes for the security vulnerability, and the like. In some illustrative embodiments, where the security vulnerability is found in source code that is shared by multiple consumers and/or contributors, the notifications may be sent to each such consumer/contributor and may be customized to the particular application(s) with which that consumer/contributor is associated and in which the security violation is known to be present to thereby identify which applications that consumer/contributor is associated with and which have the identified security vulnerability.

With regard to embodiments in which a graphical user interface (GUI) output 380 is provided, and through which a user may interact to obtain information about security vulnerabilities, various GUI views may be presented for representing information about security vulnerabilities across a plurality of applications and/or projects, organizations, and the like. For example, as will be described in greater detail hereafter with regard to FIGS. 4A-4G, in some views, a graphical/textual representation of the security vulnerability and the various applications in which the security vulnerability has been detected across multiple application development teams, code authors, organizations, consumers, and the like, may be generated along with information about the source code portions, e.g., routines, methods, sub-routines, etc., in which the security vulnerability is found and which may be replicated in these various applications, may be provided. Moreover, statistical information regarding how long it takes to perform remediation activities for the security vulnerability, the number of application scans over which the security vulnerability has been detected in applications monitored by the system, the number of times the security vulnerability has reoccurred (e.g., the security vulnerability is remediated and then reoccurs), and the like. In some cases, the GUI may present information regarding the most likely reason for the security vulnerability and the most likely result of that security vulnerability.

The GUIs presented may include various GUI elements for drilling down into specific information about specific security vulnerability instances as well as providing user feedback and commentary about the specific security vulnerability instances. For example, in some cases, a user may select an instance of a security vulnerability and drill down into the specific information about that instances of the security vulnerability. The user may provide user feedback indicating whether the instance is a false positive, should be ignored, a notification should be sent to the contributor and/or consumers of the source code in which the security vulnerability is found, or the like. Moreover, the user may add comments about the security vulnerability which may then be associated with the instance and made viewable by other users, contributors, and/or consumers.

In some cases, the GUIs may present GUI elements that allow a user to group or bundle instances of a security vulnerability and obtain information about applications in which the security vulnerability is present across a portfolio of applications. Other GUI elements may be provided for performing various other groupings of security vulnerabilities, such as based on a selected consumer, a selected contributor, or the like, and presenting various views of the security vulnerability information across a portfolio, across an organization, or the like.

Thus, the GUIs 380, in some illustrative embodiments, provide output through which users are able to view overarching security vulnerabilities caused by common code (e.g., frameworks, libraries, copied and pasted code, etc.) across their portfolio of source code for various applications. The view allows for the user to also see the personnel or organizations that are associated with the applications and initiate communications with those personnel or organizations, e.g., consumers 320 and contributors 322. Thus, the illustrative embodiments correlate security vulnerabilities in source code with various instances of that source code present in a plurality of applications, potentially across multiple organizations, development teams, or the like, with regard to developers, maintainers, and customers or users of the applications, and further correlates the instances of that source code with the identified security vulnerabilities with individuals or organizations associated with those instances.

Views of this information are presented to a user and/or communications may be automatically, or semi-automatically, sent to the individuals or organizations associated with those instances. For example, in a semi-automatic implementation, a user may obtain views of security vulnerability information for various bundles or groupings. The GUIs presenting this security vulnerability information may include GUI elements for automatic sending of notifications or communications to the consumers/contributors associated with the source code that are associated with the particular viewed bundle or grouping. Thus, the user is the one that initiates the sending of the communications or notifications with the actual content and sending of the communications or notifications being automatically generated and transmitted in response to the user's initiating of the operation. Alternatively, the communications/notifications may be automatically generated and transmitted without human intervention to initiate the operation.

Moreover, additional functionality may be provided for correlating the security vulnerabilities with solutions for the security vulnerabilities and presenting that information in the communications. This solution information may be suggestions as to how to avoid the security vulnerabilities, may be to provide information about other code in which the security vulnerability has been eliminated (e.g., patches, fixes, or the like), as well as the location of that code, or the like. In some cases, the solutions may be automatically sent to consumers of the original source code in which the security vulnerabilities were identified, as discussed herein.

In some cases, the patches or fixes for the security vulnerability may be automatically pushed to the individuals or organizations for implementation into their instances of the source code where the security vulnerability is present. That is, based on the location of patches or fixes for the security vulnerability, the GUI output/notification system 370 may actually retrieve the patch or fix and attach it to any notifications or communications sent to the consumers and contributors that are associated with the source code corresponding to the security vulnerability. Alternatively, a link to the location of the patch/fix may be inserted into the notification or communication.

In some cases, as noted above, a checkin and checkout procedure may be employed in which when a contributor remediates a previously identified security vulnerability in source code, an automated checkin/checkout procedure may be followed to distribute the remediated source code to contributors/consumers of the previous source code having the identified security vulnerability. That is, the SCRAM system may perform automated self-monitoring to identify when a contributor adds a new version of source code that has previously been identified as having a security vulnerability, and marks the new version of the source code as "remediated" or "fixed". In such instances, the mechanisms of the security vulnerability amalgamation engine may automatically send communications and/or the remediated source code to consumers and contributors associated with the previously vulnerable source code.

Thus, in some illustrative embodiments, mechanisms comprising logic in the security vulnerability amalgamation engine and/or SCRAM system may be provided that implements an automatic checkout of new versions of source code that specifically remediates the vulnerabilities found in previous source code of the same project or package registered in the SCRAM system. Programming practice for service offerings may exhibit continuous delivery in which source code is delivered to the service as the source code exits automated testing. In a continuous delivery environment, in accordance with the illustrative embodiments, checked-in source code is subject to a myriad of tests, including vulnerability testing, such as by code vulnerability analysis system 124, 330.

With the mechanisms of some illustrative embodiments, when a particular source code object, marked as "vulnerable" is fixed by a project owner, the remediated source code can be automatically "checked out" by the consumers associated with the source code that was remediated, and included in their project code base. Once the remediated source code is checked into the consumers' code base, automated testing will perform unit, integration, and vulnerability testing on the project's current code base. If the current code base passes the tests, it is automatically promoted to "production" and is delivered to the "live" system. With this capability, consumers of contributed source code can be guaranteed they will automatically receive updates to source code elements identified as vulnerable, and rely on their DevOps testing and deployment processes to include the remediated source code in their production code if tests pass, or identify new defects or security vulnerabilities that may result from such testing.

As noted above, one of the features of the illustrative embodiments is the ability to present one or more GUIs to users to obtain various levels of information about security vulnerabilities across a plurality of applications, a plurality of application development projects, a plurality of consumers, a plurality of contributors, or the like. In short, any bundling or grouping of security vulnerabilities based on a common characteristic or attribute may be requested through the one or more GUIs and the corresponding views of security vulnerability information may be presented. Moreover, the GUIs provide GUI elements for drilling down into the security vulnerability information to obtain more detailed information. Moreover GUI elements are provided for providing user feedback regarding the veracity of the security vulnerability and whether the security vulnerability should be ignored or not. In addition, GUI elements may be provided for initiating communications or notifications being sent to parties associated with the source code corresponding to the bundle or group being viewed in association with the security vulnerabilities.

Figure 4A:
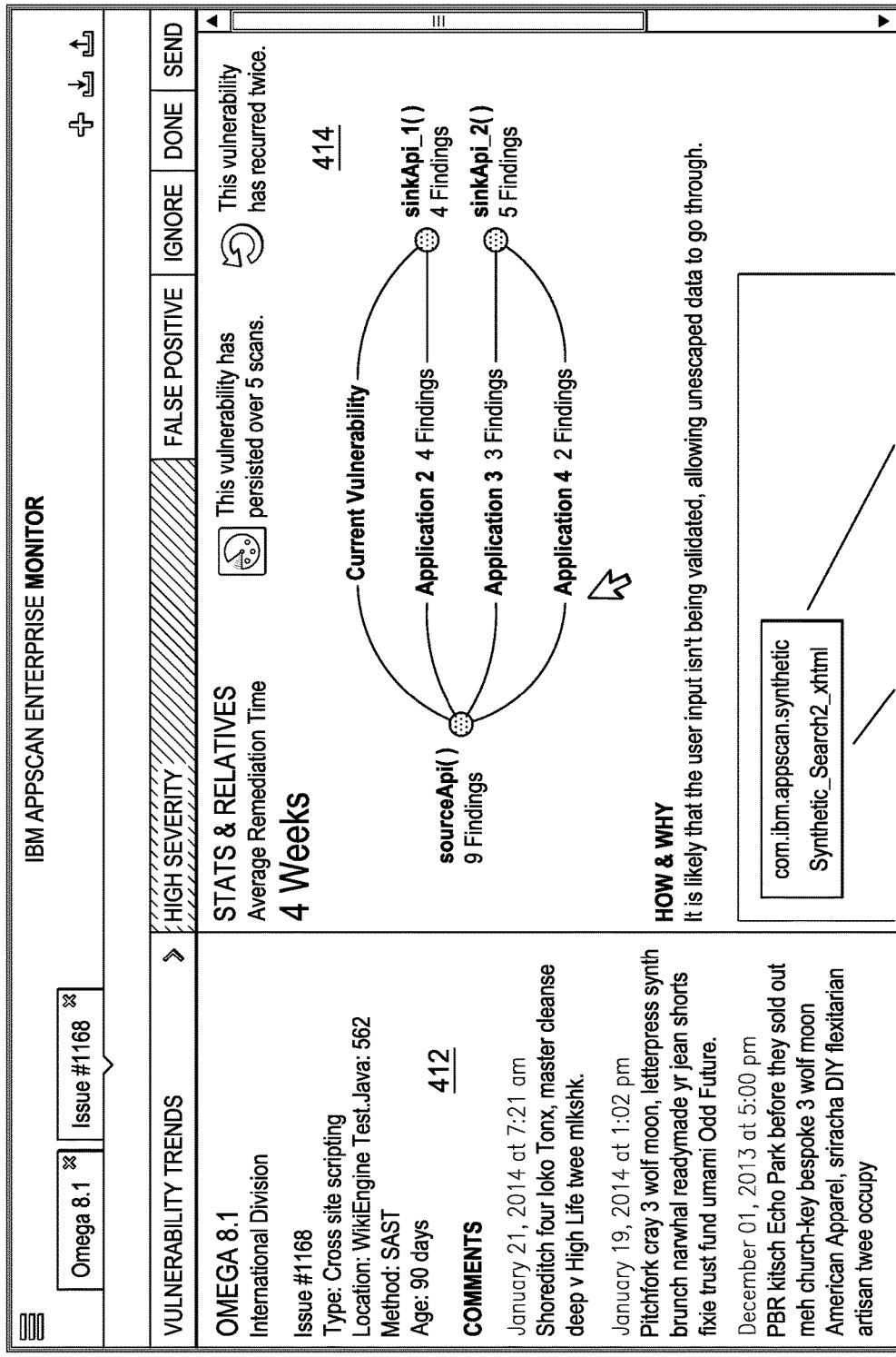
Figure 4B:
Figure 4D:
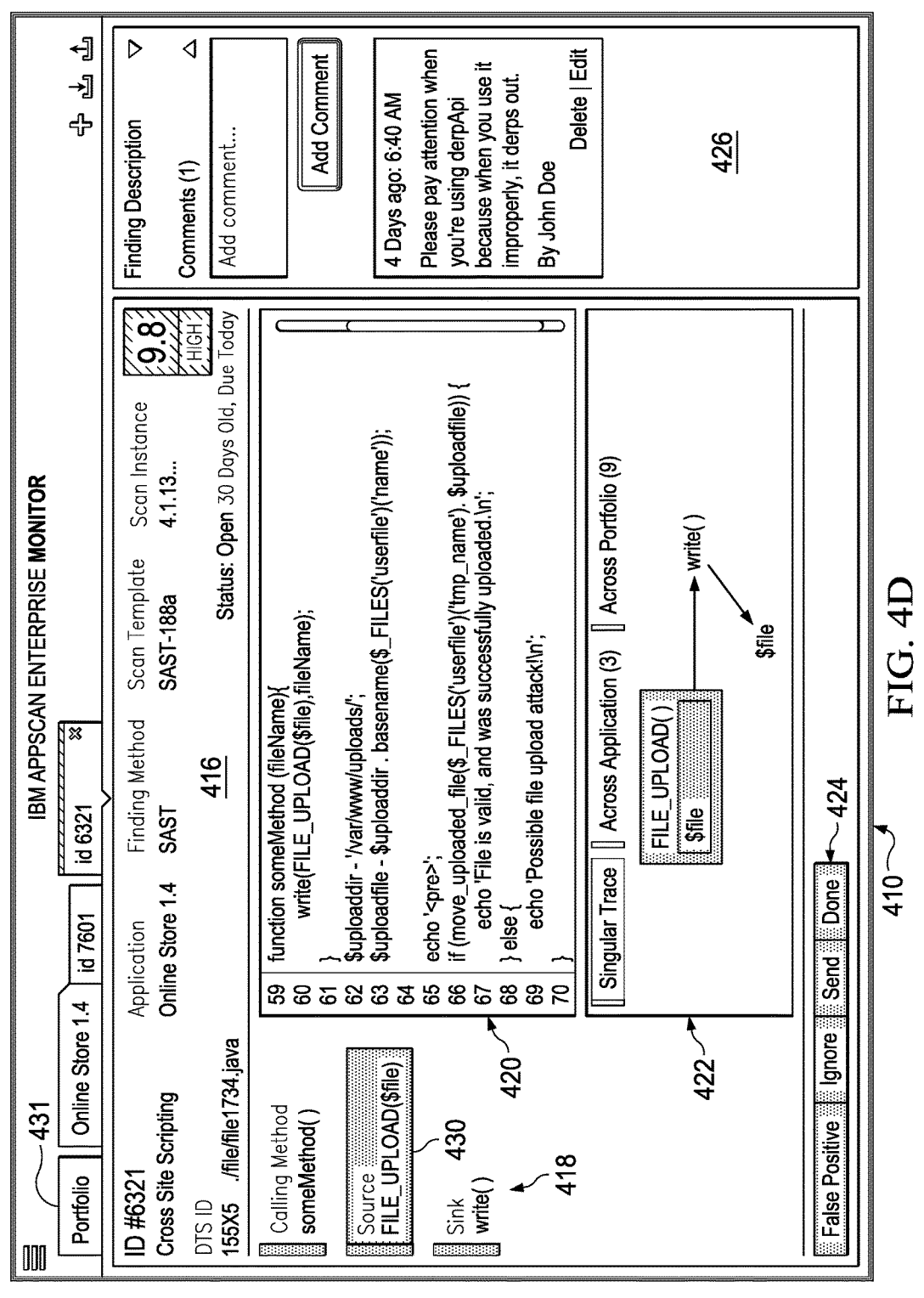
Figure 4E:
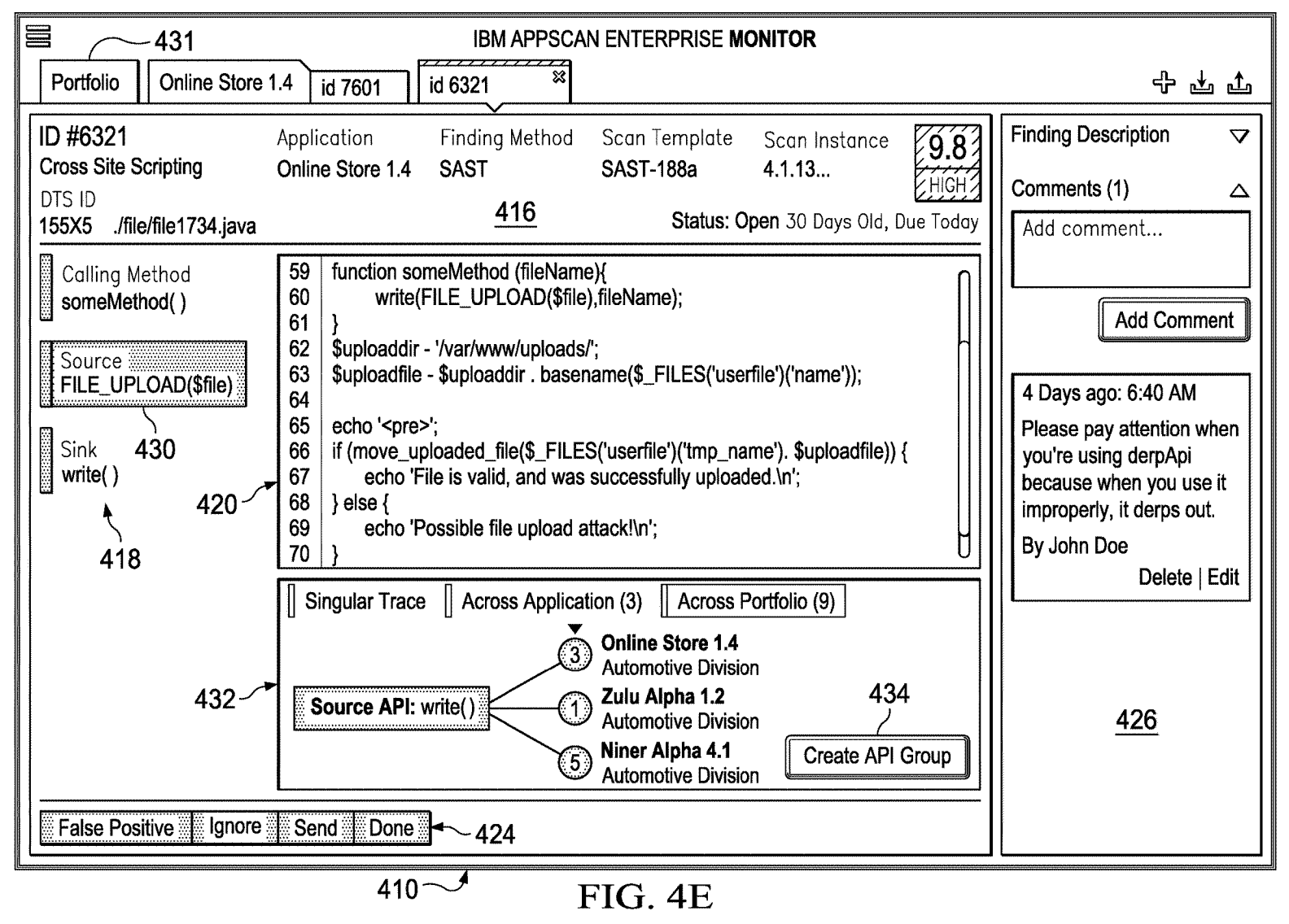
Figure 4F:
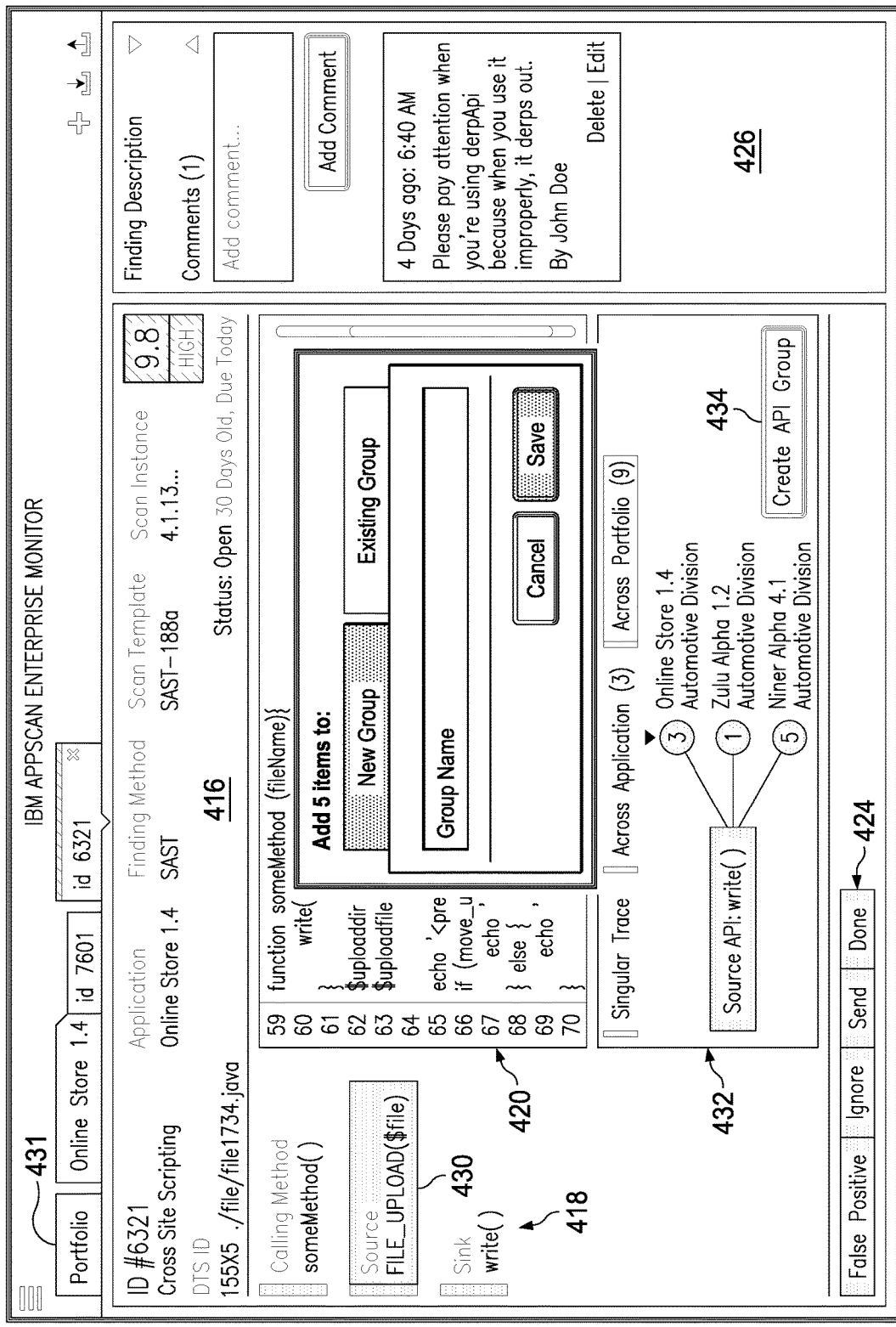
Figure 4G:
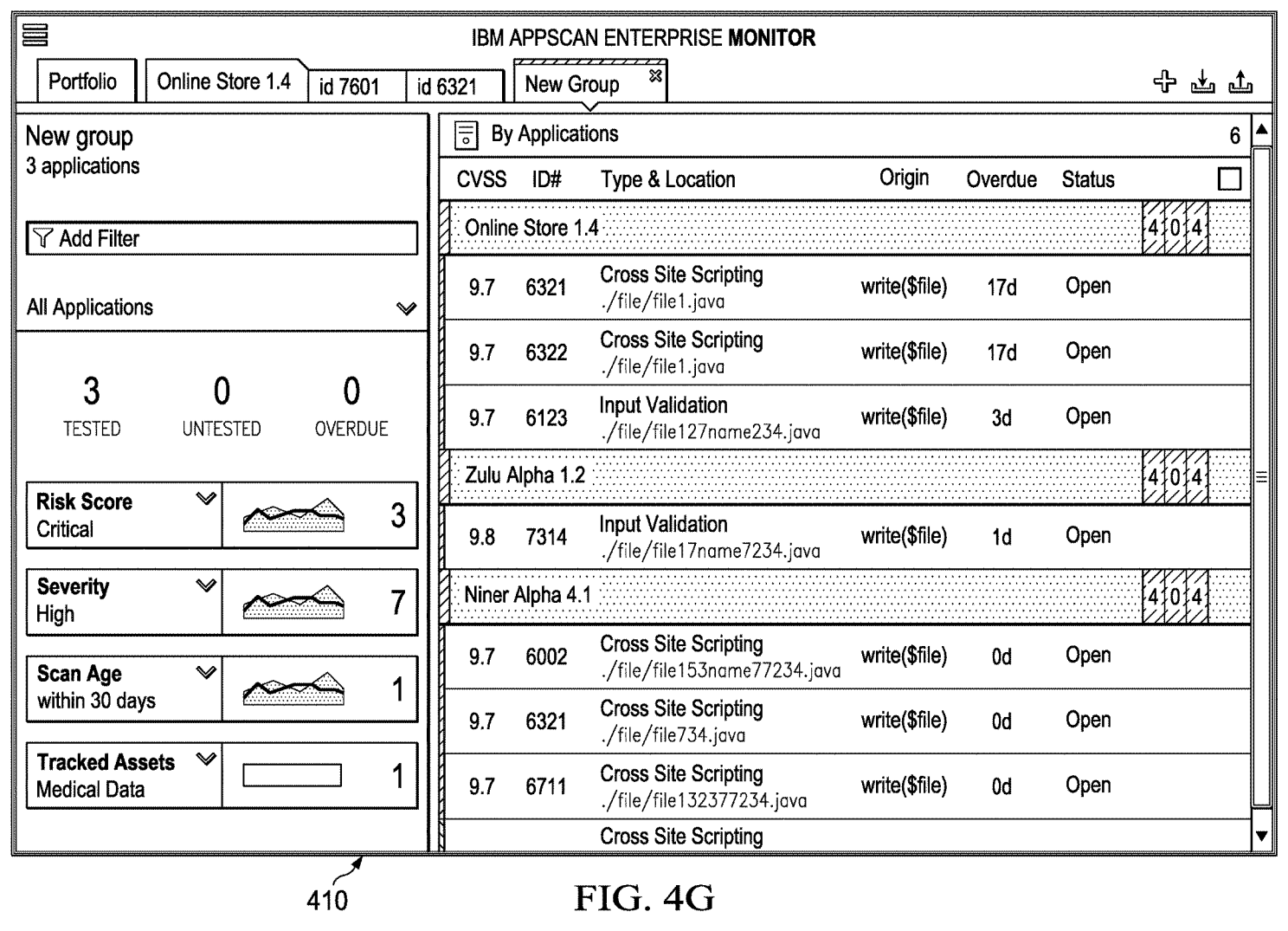

FIGS. 4A-4G illustrate various views of a graphical user interface through which a user obtains information about security vulnerabilities in code across a plurality of applications and projects and amalgamates common vulnerability information in accordance with one illustrative embodiment. FIGS. 4A-4B illustrate example views from an "application" standpoint. That is, with the GUI of FIGS. 4A-4B, the user is able to view common vulnerabilities down to specific sources and sinks. FIGS. 4C-4E show a variety of views of a specific security vulnerability within an application in response to user input to the depicted GUI. FIGS. 4F and 4G show views of a GUI created when a user bundles security vulnerabilities based on similarities of the security vulnerabilities.

The GUIs shown in FIGS. 4A-4G may be generated by the GUI output/notification system 370 in FIG. 3, for example, and may be GUIs/notifications 380 in some illustrative embodiments. It should be appreciated that the information shown in FIGS. 4A-4G is generic and intended to illustrate the form and content of an example view of security vulnerability information without divulging any sensitive security information. Thus, while elements of the figures may not represent actual security vulnerabilities, one of ordinary skill in the art can readily identify where and how actual security vulnerability information may be represented in these GUI views.

FIGS. 4A and 4B illustrate an example of a first view of graphical user interface (GUI) in which the results of a code scan of a plurality of applications are presented. As shown in FIG. 4A, the first view 410 comprises information about a single type of identified vulnerability, e.g., the Omega 8.1 security vulnerability in this example. The left hand side of the first view 410 comprises a GUI panel 412 having information about the security vulnerability including its name (Omega 8.1), the identifying authority that has identified the security vulnerability (International Division), a CVE # (#1168), a security vulnerability type (Cross Site Scripting), a location for the file in which the security vulnerability was identified, the method by which the security vulnerability was identified, e.g., SAST scan, IAST scan, DAST scan, etc., and the age which indicates how old the security vulnerability is or when the security vulnerability was detected. In addition, the GUI panel 412 comprises various comments that may have been added by authorized personnel to provide further information about the security vulnerability.

The right hand side of the first view 414 comprises a graphical representation of the instances of the security vulnerability found through code analysis and correlation with SCRAM system. In view 414, a single source, i.e. sourceAPI( ) is the beginning point of the detected security vulnerability that is shared/manifested within four applications, i.e. Applications 1 (Current Vulnerability) and Applications 2-4, and appears in 2 sinks, sinkAPI_1( ) and sinkAPI_2( ) Thus, this view shows a user that there is one source of the security vulnerability, this source appears in four applications, and that the information coming from the sourceAPI( ) having the security vulnerability will end up in sinkAPI_1( ) from applications 1 and 2, while the information coming from this same source having the security vulnerability, will end up in sinkAPI_2( ) from applications 3 and 4.

FIG. 4C shows an example graphical user interface for an instances of a security vulnerability in accordance with one illustrative embodiment. As shown in the banner 416, information about the security vulnerability identification is presented including the CVE #, referred to in the figures as ID#6321 coupled to a security vulnerability type, e.g., Cross Site Scripting in the depicted example. The banner 416 further includes information including the application where the security vulnerability was found (e.g., Online Store 1.4), the method by which the security vulnerability was identified (Static Application Security Testing (SAST)), the template that was matched to identify the security vulnerability, the application scan instances, the degree of severity of the security vulnerability (9.8 in this example), and the status of the security vulnerability (e.g., open in this case which indicates that the security vulnerability has not be rectified).

The body of the GUI 418 comprises information specific to the code in which the security vulnerability was found including the calling method (someMethod( )), the source of the security vulnerability, i.e. the portion of source code in which the security vulnerability was discovered (FILE_UPLOAD($file)), and the sink of the source (write( ). The actual code of the source is shown in a portion 420 of the GUI body 418 along with a graphical representation of the source code flow in portion 422. Various GUI elements 424 are provided for allowing a user to provide user feedback, such as whether the security vulnerability is a false positive, whether it should be ignored, or whether a notification should be sent to customers/consumers associated with the security vulnerability. A portion 426 of the GUI provides interface elements through which a user may add comments about the security vulnerability which may then be associated with the security vulnerability entry in the repository vulnerability cataloging system 350, such as part of the characteristics of the security vulnerability.

FIG. 4D illustrates a state of the GUI in response to the user selecting the source 430 of the security vulnerability, i.e. FILE_UPLOAD($file) in this example, for further drilling down into the security vulnerability information. FIG. 4E illustrates an updated GUI generated in response to the user selecting an option 431 for "Across Portfolio" which generates a graphical representation 432 of the instances of the source file and security vulnerability across multiple applications or application development projects. In the depicted example, the source API is FILE_UPLOAD ($write), with the sink being write( ), connected to applications of "Online Store 1.4", "Zulu Alpha 1.2", and "Niner Alpha 4.1" with their corresponding owning divisions, which may be the consumers of the source API. The numerical values in the nodes associated with these applications indicate the number of instances of the source API, and thus, the security vulnerabilities associated with the source API.

In addition, the GUI comprises a GUI element 434 for generated a security vulnerability group, referred to in this case as an API group. FIG. 4F shows an updated view of the GUI in response to the user's selection of the "create API group" GUI element 434 allowing the user to save the API group as part of a new group or add to an existing group.

FIG. 4G shows a consolidated view of the API group, also referred to herein as a security vulnerability group, which groups or amalgamates the same or similar security vulnerabilities across the portfolio. The view shown in FIG. 4G may be for a case where a user, e.g., a security analyst, views the same security vulnerability across multiple applications across a company or other enterprise, e.g., a large services company that creates a large number of client applications. The statistical view shown on the left hand side of the diagram may be created from date range characteristics associated with security vulnerabilities, as may be generated from security vulnerability scans or the like. For example, the "Risk Score: Critical" statistic may indicate the number of how many "critical" scores were reported per scan through the history of this particular application, group, portfolio, or the like. The shaded region of the associated graphs for the statistics may represent the specific application, group, portfolio, or other context that the user is viewing. The line of the graphs represents the average of the specific context across an entire organization or enterprise.

At this point, the user can distribute notifications of these security vulnerabilities to the various contributors and/or consumers so as to inform them of the security vulnerabilities. These notifications may further include information regarding the available patches or fixes for the security vulnerabilities, and/or may present information to assist the contributors/consumers in avoiding future instances of such security vulnerabilities.

Figure 5:
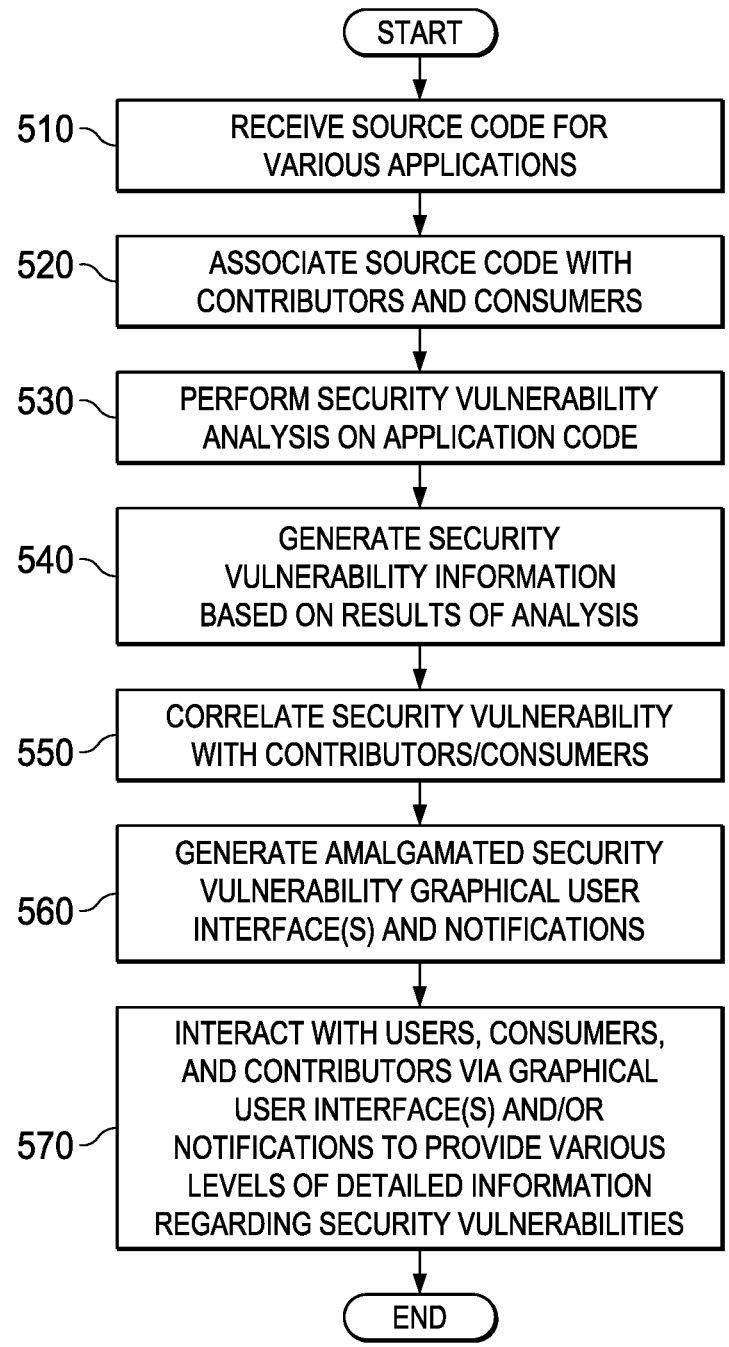
FIG. 5 is a flowchart outlining an example operation for identifying and amalgamating security vulnerabilities in code in accordance with one illustrative embodiment.

FIG. 5 is a flowchart outlining an example operation for identifying and amalgamating security vulnerabilities in code in accordance with one illustrative embodiment. The operation outlined in FIG. 5 may be implemented, for example by a security vulnerability amalgamation engine with the individual steps of the operation being performed by different systems or logic within, or associated with, the security vulnerability amalgamation engine, such as systems 122-130 in FIG. 1, or similar systems 310-370 in FIG. 3, for example.

As shown in FIG. 5, the operation starts with the security vulnerability amalgamation engine receiving source code for various applications (step 510) and the source code is associated with various contributors and/or consumers of the source code, such as in the SCRAM system described above (step 520). Security vulnerability analysis is performed on application code, such as by a code vulnerability analysis system (step 530) and security vulnerability information is generated based on the results of the analysis (step 540). The security vulnerability information may comprise characteristics of the security vulnerability which are then correlated with contributor/consumer information from the SCRAM system (step 550). This information may be stored in a repository vulnerability cataloging system data structure when may then be used as a basis for generating amalgamated security vulnerability GUI(s) and/or notifications (step 560). The users, contributors, and/or consumers may interact with these GUI(s) or notifications to provide various levels of detailed information regarding the security vulnerabilities, generate groupings of common or similar security vulnerabilities across a portfolio, organization, development teams, authors, or in accordance with any selectable characteristics of a security vulnerability (step 570). The operation then terminates.

Thus, the illustrative embodiment provide mechanisms for correlating security vulnerability information across entire portfolios of applications, across organizations, across contributors and/or consumers of source code, and the like. The processing of this amalgamated security vulnerability information may include the sending of notifications to consumers/contributors, the automated patching/fixing of multiple instances of security vulnerabilities across consumers/contributors, organizations, application development projects, and the like, the identification of flagging of source code instances where security vulnerabilities are present across portfolios, consumers and/or contributors along with links to potential patches or fixes for such security vulnerabilities, and the like. Hence, a large scale security vulnerability amalgamation solution is provided that tracks security vulnerabilities across distributed organizations, portfolios of applications, groups of consumers and/or contributors, and the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, for correlating security vulnerability detection across multiple applications, the method comprising:

performing, by the data processing system, a security vulnerability analysis of first source code of a first application;

identifying, by the data processing system, based on results of the security vulnerability analysis, a security vulnerability in a first portion of the first source code;

associating, by the data processing system, characteristics of the security vulnerability with the first portion, wherein associating the characteristics of the security vulnerability with the first portion comprises performing, by the data processing system, a lookup operation in a source code repository and management (SCRAM) system for an identifier of the first source code that identifies at least one of consumers of the first source code or contributors to the first source code and wherein the SCRAM system stores entries for a plurality of source codes, each source code being mapped to either contributor information identifying individual persons or organizations that contributed to the creation of the source code or consumer information identifying individual persons or organizations that utilize the source code in one or more applications implemented by the consumer;

correlating, by the data processing system, the characteristics of the security vulnerability with second source code of a second application based on the association of the characteristics of the security vulnerability with the first portion; and generating, by the data processing system, an output to a computing device of a consumer or contributor associated with the second source code identifying a presence of the security vulnerability in the second source code based on the correlation.

2. The method of claim 1, wherein generating the output to the computing device of the consumer or contributor comprises:

automatically detecting, by the data processing system, a new version of the first source code indicated to remediate the security vulnerability; and automatically forwarding, by the data processing system, the new version of the first source code to the computing device in response to detecting the new version.

3. The method of claim 1, wherein generating the output to the computing device further comprises sending the output to a computing device associated with one of a consumer or a contributor identified based on the lookup operation.

4. The method of claim 1, wherein correlating, by the data processing system, the characteristics of the security vulnerability with second source code of a second application based on the association of the characteristics of the security vulnerability with the first portion comprises:

generating, by the data processing system, an entry in a security vulnerability cataloging system that correlates the characteristics of the security vulnerability with one or more consumers or contributors associated with the first source code and the second source code.

5. The method of claim 1, wherein entries in a security vulnerability cataloging system are bundled together based on at least one of similarities of characteristics of security vulnerabilities, similarity of consumers, or similarity of contributors.

6. The method of claim 5, wherein the output comprises a graphical user interface in which security vulnerabilities in source code across an enterprise are depicted based on the bundling of the entries in the security vulnerability cataloging system.

7. The method of claim 5, wherein the output comprises a graphical user interface in which at least one of a plurality of consumers or contributors that are associated with a same or similar security vulnerability are depicted based on the bundling of entries in the security vulnerability cataloging system.

8. The method of claim 5, wherein the output comprises a graphical user interface in which, for a specified consumer or contributor, all of the security vulnerabilities associated with the specified consumer or contributor are depicted based on the bundling of entries in the security vulnerability cataloging system.

9. The method of claim 5, wherein the output comprises a graphical user interface in which, for a specific source code, all of the security vulnerabilities associated with at least one of consumers or contributors associated with the specific source code, are depicted based on the bundling of entries in the security vulnerability cataloging system.

10. A computer program product comprising a computer readable storage medium having a computer readable program stored therein, wherein the computer readable program, when executed by a data processing system, causes the data processing system to:

perform a security vulnerability analysis of first source code of a first application;

identify, based on results of the security vulnerability analysis, a security vulnerability in a first portion of the first source code;

associate characteristics of the security vulnerability with the first portion, wherein the computer readable program further causes the data processing system to associate characteristics of the security vulnerability with the first portion by performing, by the data processing system, a lookup operation in a source code repository and management (SCRAM) system for an identifier of the first source code that identifies at least one of consumers of the first source code or contributors to the first source code and wherein the SCRAM system stores entries for a plurality of source codes, each source code being mapped to either contributor information identifying individual persons or organizations that contributed to the creation of the source code or consumer information identifying individual persons or organizations that utilize the source code in one or more applications implemented by the consumer;

correlate the characteristics of the security vulnerability with second source code of a second application based on the association of the characteristics of the security vulnerability with the first portion; and generate an output to a computing device of a consumer or contributor associated with the second source code identifying a presence of the security vulnerability in the second source code based on the correlation.

11. The computer program product of claim 10, wherein the computer readable program further causes the data processing system to generate the output to the computing device of the consumer or contributor at least by:

automatically detecting, by the data processing system, a new version of the first source code indicated to remediate the security vulnerability; and automatically forwarding, by the data processing system, the new version of the first source code to the computing device in response to detecting the new version.

12. The computer program product of claim 10, wherein the computer readable program further causes the data processing system to generate the output to the computing device further at least by sending the output to a computing device associated with one of a consumer or a contributor identified based on the lookup operation.

13. The computer program product of claim 10, wherein entries in security vulnerability cataloging system are bundled together based on at least one of similarities of characteristics of security vulnerabilities, similarity of consumers, or similarity of contributors.

14. The computer program product of claim 13, wherein the output comprises a graphical user interface in which security vulnerabilities in source code across an enterprise are depicted based on the bundling of the entries in the security vulnerability cataloging system.

15. The computer program product of claim 13, wherein the output comprises a graphical user interface in which at least one of a plurality of consumers or contributors that are associated with a same or similar security vulnerability are depicted based on the bundling of entries in the security vulnerability cataloging system.

16. The computer program product of claim 13, wherein the output comprises a graphical user interface in which, for a specified consumer or contributor, all of the security vulnerabilities associated with the specified consumer or contributor are depicted based on the bundling of entries in the security vulnerability cataloging system.

17. The computer program product of claim 13, wherein the output comprises a graphical user interface in which, for a specific source code, all of the security vulnerabilities associated with at least one of consumers or contributors associated with the specific source code are depicted based on the bundling of entries in the security vulnerability cataloging system.

18. An apparatus comprising:
a processor; and
a memory coupled to the processor, wherein the memory comprises instructions which, when executed by the processor, cause the processor to:
perform a security vulnerability analysis of first source code of a first application;
identify, based on results of the security vulnerability analysis, a security vulnerability in a first portion of the first source code;
associate characteristics of the security vulnerability with the first portion, wherein the instructions farther cause the processor to associate characteristics of the security vulnerability with the first portion by performing, by the processor, a lookup operation in a source code repository and management (SCRAM) system for an identifier of the first source code that identifies at least one of consumers of the first source code or contributors to the first source code and wherein the SCRAM system stores entries for a plurality of source codes, each source code being mapped to either contributor information identifying individual persons or organizations that contributed to the creation of the source code or consumer information identifying individual persons or organizations that utilize the source code in one or more applications implemented by the consumer;
correlate the characteristics of the security vulnerability with second source code of a second application based on the association of the characteristics of the security vulnerability with the first portion; and
generate an output to a computing device of a consumer or contributor associated with the second source code identifying a presence of the security vulnerability in the second source code based on the correlation.

* * * * *